US012776917B2

(12) United States Patent
Bull et al.

(10) Patent No.: US 12,776,917 B2
(45) Date of Patent: Oct. 27, 2026

(54) CRYPTOGRAPHIC PROOF OF IDENTITY WITH INDEPENDENT VERIFICATION AND PROVABLE RECOVERY

(71) Applicant: Cisco Technology, Inc., San Jose, CA (US)

(72) Inventors: Oliver James Bull, Bristol (GB); Louis Gwyn Samuel, Gloucestershire (GB)

(73) Assignee: Cisco Technology, Inc., San Jose, CA (US)

( * ) Notice: Subject to any disclaimer, the term of this patent is extended or adjusted under 35 U.S.C. 154(b) by 464 days.

(21) Appl. No.: 17/890,414

(22) Filed: Aug. 18, 2022

(65) Prior Publication Data

US 2024/0064023 A1 Feb. 22, 2024

(51) Int. Cl.
*H04L 9/32* (2006.01)
*H04L 9/30* (2006.01)

(52) U.S. Cl.
CPC .............. *H04L 9/3247* (2013.01); *H04L 9/30* (2013.01)

(58) Field of Classification Search
CPC . H04L 9/30; H04L 9/3268; H04L 9/50; H04L 9/3247; H04L 9/32; H04L 9/3236
See application file for complete search history.

(56) References Cited

U.S. PATENT DOCUMENTS 9,749,140 B2 8/2017 Oberhauser et al.
9,762,396 B2 9/2017 Susan et al.
10,127,378 B2 11/2018 Toth
10,284,379 B1 * 5/2019 Muftic .................. H04L 9/3265
10,581,613 B2 3/2020 Ford et al.
10,735,397 B2 8/2020 Ronda et al.
11,336,463 B2 5/2022 Salimi et al.
11,563,590 B1 1/2023 Bowen et al.
11,870,768 B1 1/2024 Vishwakarma et al.
11,888,997 B1 1/2024 Bowen et al.
11,997,222 B1 5/2024 Bowen et al.
2005/0138379 A1 * 6/2005 Semple ................. H04W 12/06 713/170
2018/0287800 A1 10/2018 Chapman et al.
2018/0359096 A1 * 12/2018 Ford ..................... H04L 9/3247
2019/0097812 A1 * 3/2019 Toth ...................... H04L 9/0841
2019/0158298 A1 * 5/2019 Muftic .................. H04L 9/3265
2019/0356469 A1 11/2019 Deshpande et al.
2020/0007346 A1 * 1/2020 Callan ................... H04L 9/3247
2020/0127851 A1 * 4/2020 Finlow-Bates ..... H04L 63/0823
2020/0137064 A1 4/2020 Wu et al.
2020/0210519 A1 7/2020 Wang et al.
(Continued)

OTHER PUBLICATIONS

Smith, S.M. Key Event Receipt Infrastructure (KERI). arXiv 2019, arXiv:1907.02143 hereafter Smith. (Year: 2019).*
(Continued)

*Primary Examiner* — Tae K Kim
(74) *Attorney, Agent, or Firm* — Lee & Hayes, P.C.

(57) ABSTRACT

In one embodiment, a device identifies, for an existing digital identifier, a public key, a sequence number, and a signature. The device forms a new digital identifier that includes the public key, the sequence number, and the signature identified by the device for the existing digital identifier. The device signs the new digital identifier with a new signature using a private key. The device uses the new digital identifier to prove legitimacy of data associated with the new digital identifier.

20 Claims, 10 Drawing Sheets

(56) References Cited

U.S. PATENT DOCUMENTS

| | | | |
|---|---|---|---|
| 2020/0382326 | A1 | 12/2020 | Guo et al. |
| 2021/0012947 | A1 | 1/2021 | Ishima et al. |
| 2021/0058786 | A1 | 2/2021 | Yang et al. |
| 2021/0194703 | A1 | 6/2021 | Queralt et al. |
| 2021/0377254 | A1 | 12/2021 | Avetisov et al. |
| 2022/0060335 | A1 | 2/2022 | Pinedo Hoyvik et al. |
| 2022/0376889 | A1 | 11/2022 | Kaizer et al. |
| 2023/0336530 | A1 | 10/2023 | Roy et al. |
| 2023/0385811 | A1 | 11/2023 | Naidoo et al. |
| 2023/0421389 | A1 | 12/2023 | Hillier et al. |
| 2024/0048361 | A1 * | 2/2024 | Berger .................... H04L 9/088 |

OTHER PUBLICATIONS

C. -S. Park and H. -M. Nam, “A New Approach to Constructing Decentralized Identifier for Secure and Flexible Key Rotation,” in IEEE Internet of Things Journal, vol. 9, No. 13, pp. 10610-10624, Jul. 1, 2022, doi: 10.1109/JIOT.2021.3121722. (Year: 2022).*

“Digital Identity”, online: https://en.wikipedia.org/wiki/Digital_identity, Jun. 28, 2022, accessed Aug. 2, 2022, 10 pages, Wikimedia Foundation, Inc.

Smith, Samuel M., “Key Event Receipt Infrastructure (KERI) Design”, online: https://arxiv.org/ftp/arxiv/papers/1907/1907.02143.pdf, May 7, 2021, accessed Aug. 5, 2022, 141 pages, arxiv.org.

* cited by examiner

CRYPTOGRAPHIC PROOF OF IDENTITY WITH INDEPENDENT VERIFICATION AND PROVABLE RECOVERY

TECHNICAL FIELD

The present disclosure relates generally to computer networks, and, more particularly, to cryptographic proof of identity with independent verification and provable recovery.

BACKGROUND

As digital transactions are increasingly being performed over the Internet, the use of digital identities has also increased. In general, a digital identity may loosely refer to any information available online regarding a person, organization, device, application, website, or other entity associated with a transaction. Thus, ensuring the integrity of a digital transaction is also contingent on ensuring the legitimacy of the one or more digital identities involved in the transaction. For instance, consider the case of a new version of software being released. Without verifiable proof of the legitimacy of the version of software, a malicious entity could easily trick users into inadvertently installing malware, instead.

Typically, a public key infrastructure (PKI) approach is taken to ensure the legitimacy of a digital identity. Under PKI, a trusted certificate authority (CA) is used to attest to the legitimacy of a certificate and public key associated with a certain entity participating in a transaction. This means that the legitimacy and trustworthiness of a CA are paramount to any PKI implementation, bringing its own set of risks, costs, and complexities. Moreover, discovery of a compromised key or certificate in a PKI implementation is often difficult. In such cases, the only recourse would be to revoke the affected certificate and updating any intermediate certificates, which could be quite widespread.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
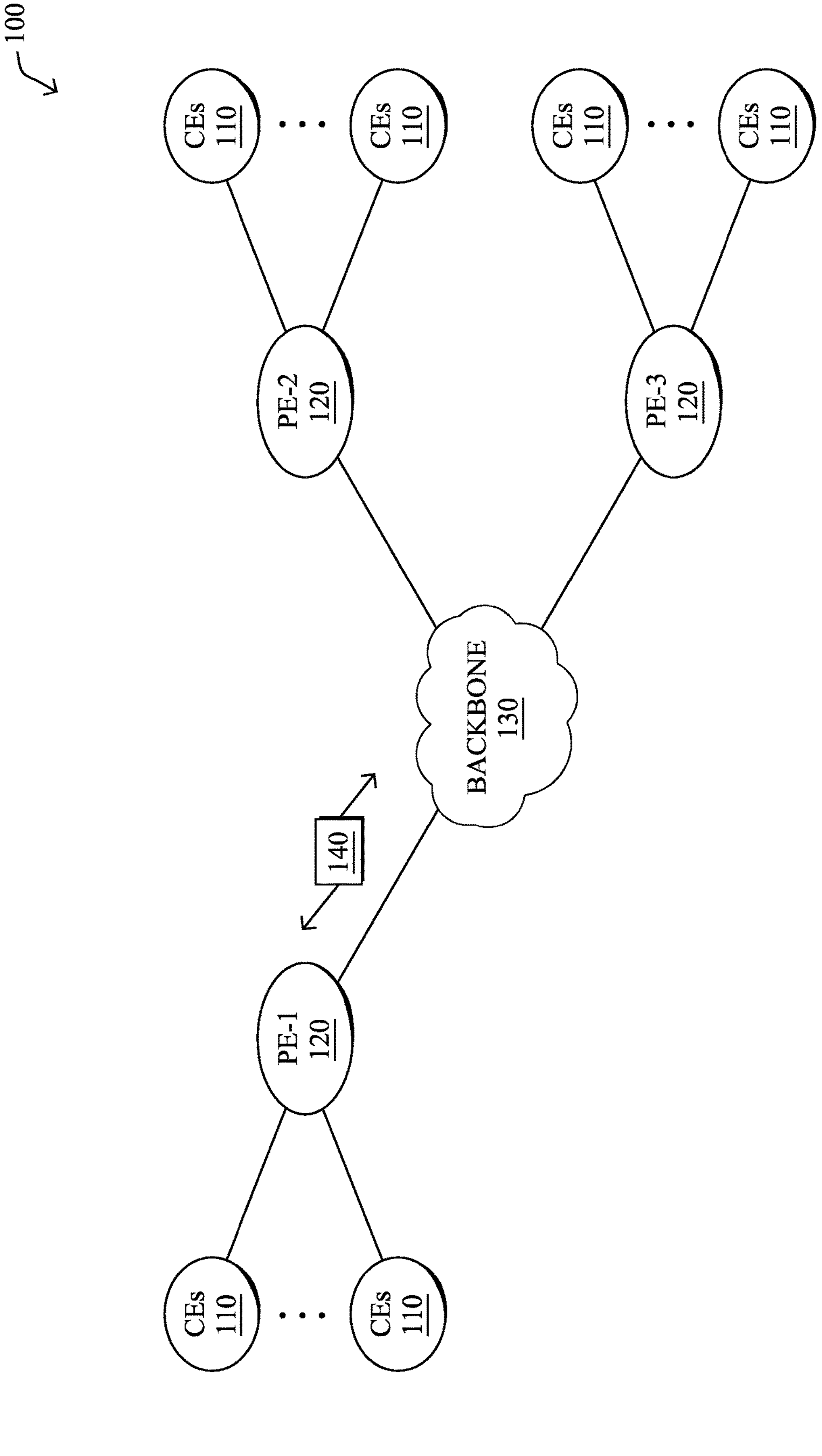
FIGS. 1A-1B illustrate an example communication network.

According to one or more embodiments of the disclosure, a device identifies, for an existing digital identifier, a public key, a sequence number, and a signature. The device forms a new digital identifier that includes the public key, the sequence number, and the signature identified by the device for the existing digital identifier. The device signs the new digital identifier with a new signature using a private key. The device uses the new digital identifier to prove legitimacy of data associated with the new digital identifier.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
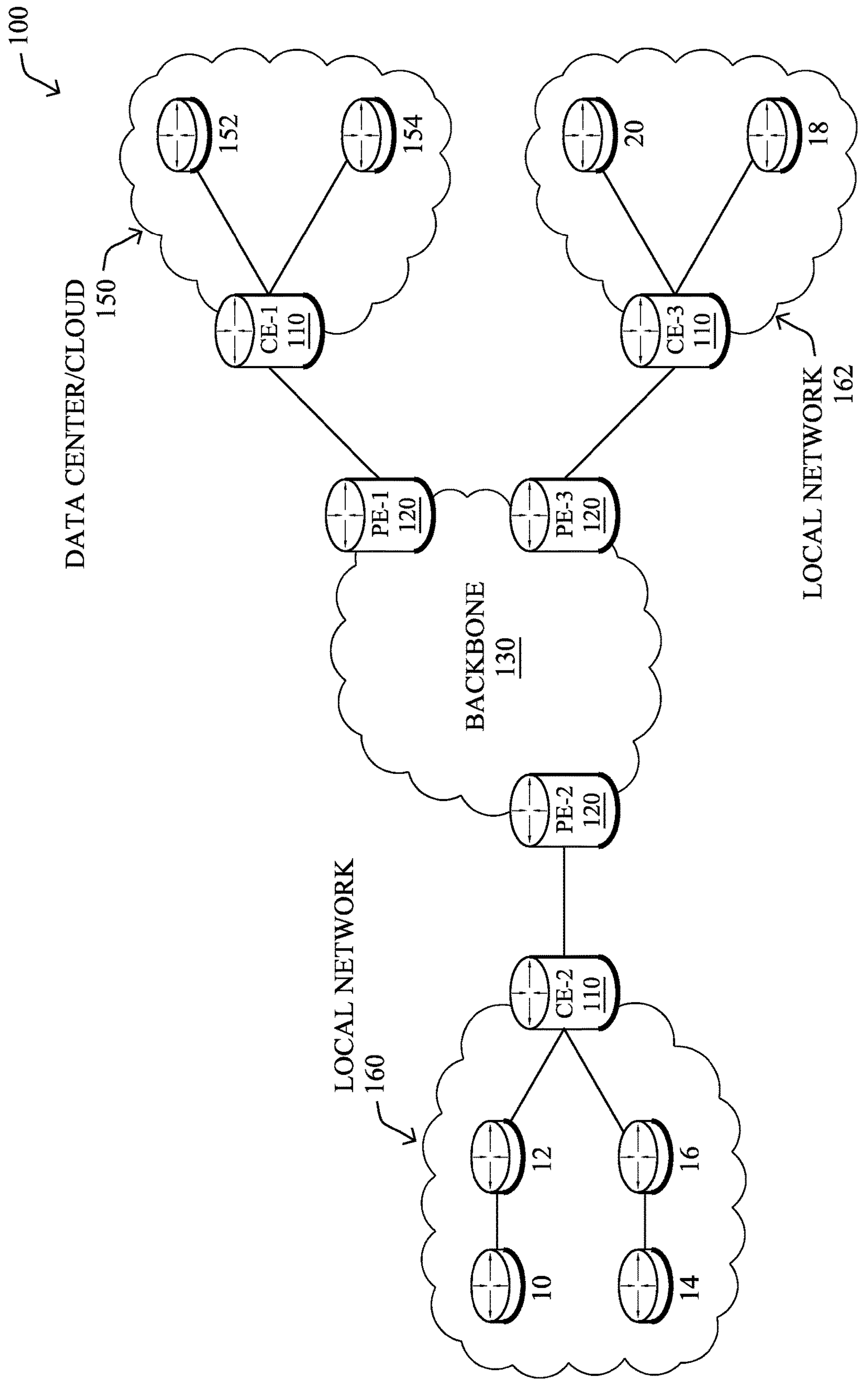

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
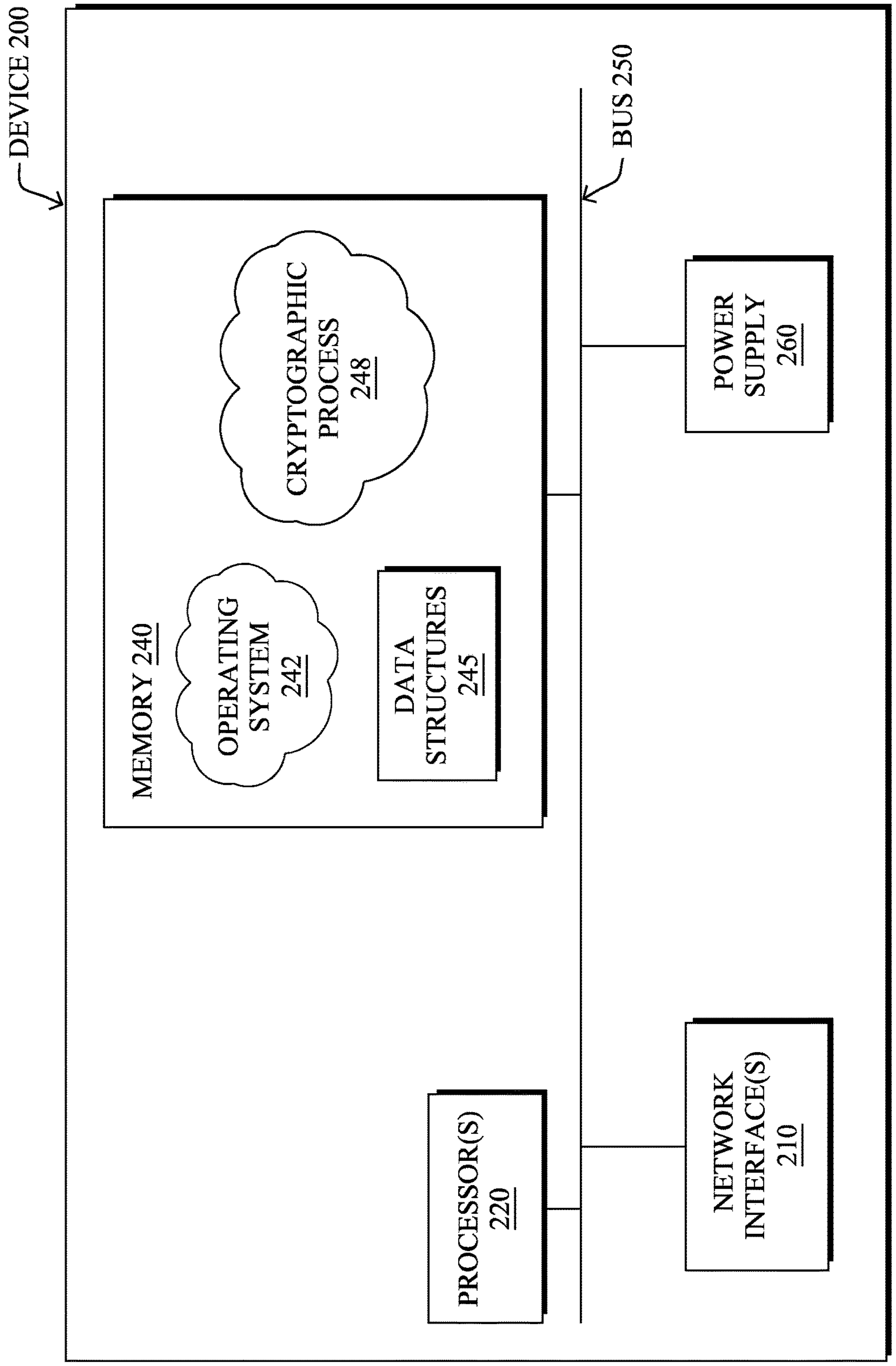
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a cryptographic process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, as digital transactions are increasingly being performed over the Internet, the use of digital identities has also increased. In general, a digital identity may loosely refer to any information available online regarding a person, organization, device, application, website, or other entity associated with a transaction. Thus, ensuring the integrity of a digital transaction is also contingent on ensuring the legitimacy of the one or more digital identities involved in the transaction. For instance, consider the case of a new version of software being released. Without verifiable proof of the legitimacy of the version of software, a malicious entity could easily trick users into inadvertently installing malware, instead.

Typically, a public key infrastructure (PKI) approach is taken to ensure the legitimacy of a digital identity. The foundation of PKI is the use of public and private key pairs that enable asymmetric cryptography delivering the ability for the private key holder to sign an item that can be verified by the public key. Under PKI, a trusted certificate authority (CA) is used to attest to the legitimacy of a certificate and public key associated with a certain entity participating in a transaction. This means that the legitimacy and trustworthiness of a CA are paramount to any PKI implementation, bringing its own set of risks, costs, and complexities. Moreover, discovery of a compromised key or certificate in a PKI implementation is often difficult. In such cases, the only recourse would be to revoke the affected certificate and updating any intermediate certificates, which could be quite widespread

Cryptographic Proof of Identity with Independent Verification and Provable Recovery The techniques herein allow for the generation of digital identities that are able to be verified independently (e.g., without the need for a CA). In some aspects, the techniques herein also introduce a recovery mechanism whereby a digital identity can be reclaimed, even if keys are compromised. In further aspects, the digital identities generated using the techniques herein may be used to create credential lifecycle procedures that enable the credential to evolve with the component to which it is bound, with historical traceability through micro-ledgers. The credential creates a cryptographically traceable history that is independent of any source control or package distribution library.

Illustratively, the techniques described herein may be performed by hardware, software, and/or firmware, such as in accordance with cryptographic process 248, which may include computer executable instructions executed by the processor 220 (or independent processor of interfaces 210) to perform functions relating to the techniques described herein.

Specifically, according to various embodiments, a device identifies, for an existing digital identifier, a public key, a sequence number, and a signature. The device forms a new digital identifier that includes the public key, the sequence number, and the signature identified by the device for the existing digital identifier. The device signs the new digital identifier with a new signature using a private key. The device uses the new digital identifier to prove legitimacy of data associated with the new digital identifier.

Figure 3:
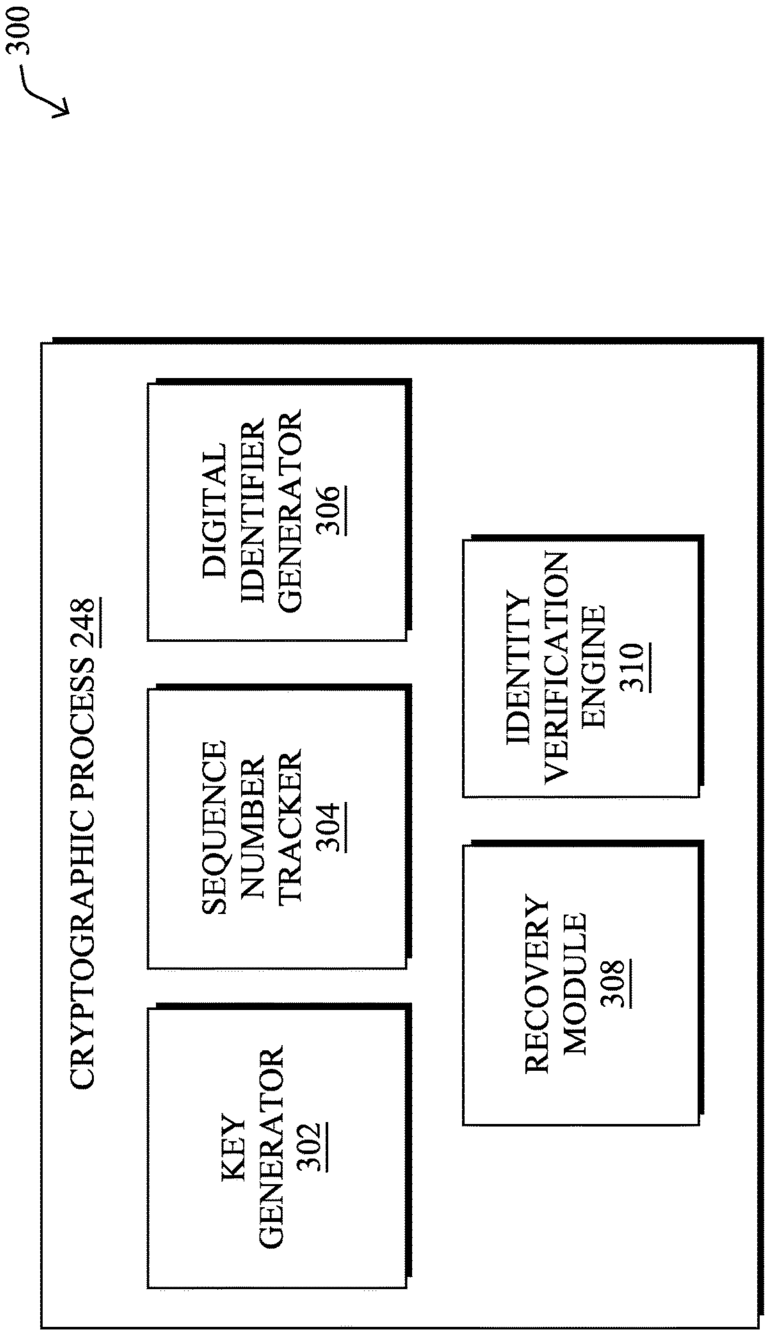
FIG. 3 illustrates an example architecture for cryptographic proof of identity.

Operationally, FIG. 3 illustrates an example architecture 300 for cryptographic proof of identity, according to various embodiments. At the core of architecture 300 is cryptographic process 248, which may be executed by a computing device (e.g., device 200).

As shown, cryptographic process 248 may include any or all of the following components: a key generator 302, a sequence number engine 304, a digital identifier generator 306, a recovery module 308, and/or an identity verification engine 310. As would be appreciated, the functionalities of these components may be combined or omitted, as desired. In addition, these components may be implemented on a singular device or in a distributed manner, in which case the combination of executing devices can be viewed as their own singular device for purposes of executing cryptographic process 248.

In various embodiments, key generator 302 may be responsible for generating key pairs that are used by cryptographic process 248 for purposes of generating digital identities. Typically, such key pairs may include both a private key, as well as a public key, which may be asymmetric, in some embodiments. To do so, key generator 302 may leverage any number of different key-generating algorithms. For instance, key generator 302 may leverage an Edwards-curve Digital Signature Algorithm (EdDSA), such as Ed25519, which uses SHA-2 and Curve25519, to generate the public and private key pairs.

Sequence number engine 304 may be responsible for generating and maintaining the sequence numbers associated with the different versions of a digital identity, in some embodiments. More specifically, in order to maintain a verifiable chain of digital identifiers, sequence numbers may be used as part of the digital identifiers, to be able to discern which digital identifier predates another (e.g., a higher sequence number may be considered 'newer' or 'older,' depending on whether the sequence numbers are incremented or decremented). For instance, such a sequence number may take the form of a 64-bit number that is incremented every time that the digital identity is rotated (i.e., when a new digital identifier is generated for that identity). In such a case, the sequence number may be seeded as a random 32-bit number. Of course, other sized sequence numbers could also be used, as desired.

According to various embodiments, digital identifier generator 306 may be responsible for generating a digital identifier in accordance with the techniques herein. To do so, digital identifier generator 306 may leverage the keys generated by key generator 302 and the sequence number information from sequence number engine 304, to generate a digital identifier. The end result of this generation is a chain of digital identifiers for an entity that are independently verifiable and provide a cryptographic proof of lineage for the identifiers. More specifically, digital identifier generator 306 may generate a digital identifier that includes both a future forward, and past reverse, binding through a digest (future) and signature (past), which delivers the cryptographic proof. In addition, this chaining of digital identifiers also allows for the rotation of identifiers over time in a cryptographically provable manner, which increases the security of the identifier through the development of historical activities.

Figure 4:
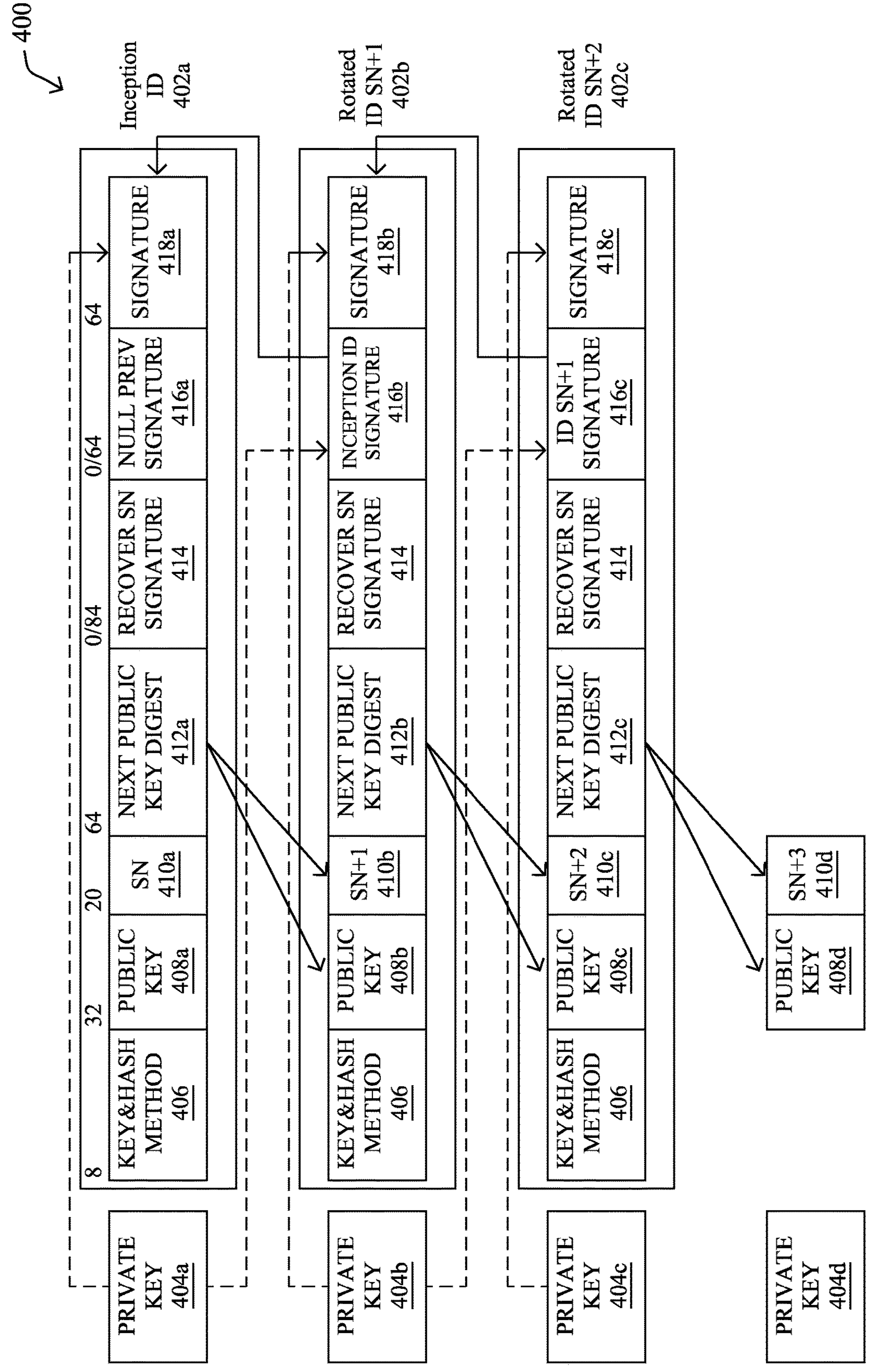
FIG. 4 illustrates an example diagram of the generation of digital identifiers.

To illustrate the operations of digital identifier generator 306 FIG. 4 illustrates an example diagram 400 of the generation of digital identifiers, according to some embodiments. As shown, a digital identifier 402 generated by digital identifier generator 306 may include any or all of the following fields:

- Key & Hash Method Information Field 406—this information may indicate the keying and hashing algorithms used to generate the digital identifier 402. Such information may, for instance, take the form of predefined identifiers.
- Public Key Field 408—the public key generated by key generator 302 using the corresponding algorithm identified in information 406. For instance, public key 408 take the form of a 256-bit, E25519 public key. During this generation, a corresponding private key 408 is also generated.
- Sequence Number Field 410—the sequence number generated by digital identifier generator 306. For instance, this may be a 64-bit number that is incremented each time the digital identity is rotated (e.g., when a new digital identifier 402 is generated for the identity, and seeded as a random 32-bit number.
- Next Public Key Digest Field 412—a digest that indicates the next public key 408 to be used by the next digital identifier 402 in the chain. For instance, this may take the form of a 512-bit digest, such as an SHA3 Shake 256-based digest.
- Recover Sequence Number/Signature Field 414—this field serves to recovery of the digital identity in the case of a malicious actor compromising the keys of the system and generating a malicious digital identifier 402, as described further below. More specifically, this field may only be present for purposes of recovery and serves as proof of ownership of the digital identity.
- Previous Signature Field 416—this field includes the signature of the previous digital identifier 402 in the chain that was created using the corresponding private key for that previous digital identifier 402. As there is no prior digital identifier 402 in the chain in the case of an inception identifier (e.g., inception identifier 402*a* in FIG. 4), this field may be omitted or otherwise so indicated.
- Signature Field 418—this field stores the signature applied to the above fields using the private key 404 that is paired with the public key 408 of the digital identifier 402.

An example of a base-64 encoded normal digital identifier 402 is as follows:

MDAwMDAwMDXHAcUUKhESoUj9mSBD1aoASdtJ/
1/9ipfSNex0gOa0ZzAwMDAwMDAwMDAzMTA3-
Nzc5NjQ4bhFrcTiCD1QBztbY+oWvKKOZP74a-
uOcy+5vos4eaCUYUWJPhrBGxbQbwyennBAl0-
FrQm9jXU2J5YPkOTN0mXPk7uwWZEcbTxZs/
ZrAhecnberrqV1IjdGHjr9bnhl3Gw6Ps3S7yPr7yh-
PqXMuWunzT5m4/FCUsnix2Qs+FHDTAYw1+
g06vj7eCym8nTFdKZF3F90dxgi8An6be61GOe7-
YykkYxn0qQU28UM4Qg/wHqqrsThVEqFU-
PLp1CmQnjGcL As would be appreciated, key generation for the next digital identifier 402 may occur at rotation into a new digital identifier 402 and the next public key to be used included in its key digest field 412. Similarly, a new digital identifier 402 may also embed the signature of its preceding digital identifier 402. For instance, digital identifier 402*b* may be derived from inception identifier 402*a* and include the public key in field 408*b* that was included in the digest field 412*a* of inception identifier 402*a*, as well as the signature from field 416*b* that was previously used as the signature in field 418*a* of inception identifier 402*a*.

As a result of the above approach, there is coherence between the digital identifier 402 and verification is possible with only the contents of the digital identifier 402, without needing a central validation agent. In addition, verification of the chain/sequence of digital identifier 402 is also possible using only the contents of the digital identifiers, without needing a central validation agent.

Another aspect of the above approach is the ability to also fork a digital identifier 402 into both a new digital identifier 402 for the primary chain, as well as one that serves as a secondary inception identifier for a forked chain that has a reverse link back to the forked digital identifier 402. This process is described in greater detail below. In addition, as detailed further below, the above approach also provides for the possibility to the recovery of a compromised private key by proving historical ownership of a key embedded into the recovery identifier.

While not required, the following best practices are recommended:

- After creating an inception identifier, immediately rotate the digital identifier 402 at least once and store all non-active private keys for recovery proof. Preferably, the inception identifier should be rotated many times (e.g., fifty or more times), to build up a greater opportunity for the use of recovery proofs over a long time period.
- The inception digital identifier 402 and its private key 404 should be stored remotely (e.g., off-network), as this is the final recovery option before theft of the digital identity becomes unrecoverable.
- For additional security, any of the non-active private keys generated by rotating the inception digital identifier 402 for purposes of recovery should be stored in separate locations and only used in the event of recovery.
- Active key pairs (e.g., the key pair for the next in line digital identifier 402) should also be stored and used for proofing, securely.

Referring again to FIG. 3, cryptographic process 248 may also include recovery module 308, which is responsible for the recovery of a digital identity in the case of a malicious attacker generating a new digital identifier 402, in some embodiments. Using the above approach, an attacker would need to obtain the following, to compromise the digital identity:

- The active private key for the current digital identifier 402
- The active private key for the next digital identifier 402
- The active public key for the next digital identifier 402

Thus, even if an attacker had all the above keys, the identity can be recovered easily, so long as the attacker does not also have an older SN-x public key. It is for this reason that it is recommended that the inception identifier 402 be rotated serval times, to create a set of keys that can be used for purposes of recovery. It is also for this reason that remote storage of these keys at a secure location is also recommended, as they represent the last line of defense against compromise.

Figure 5:
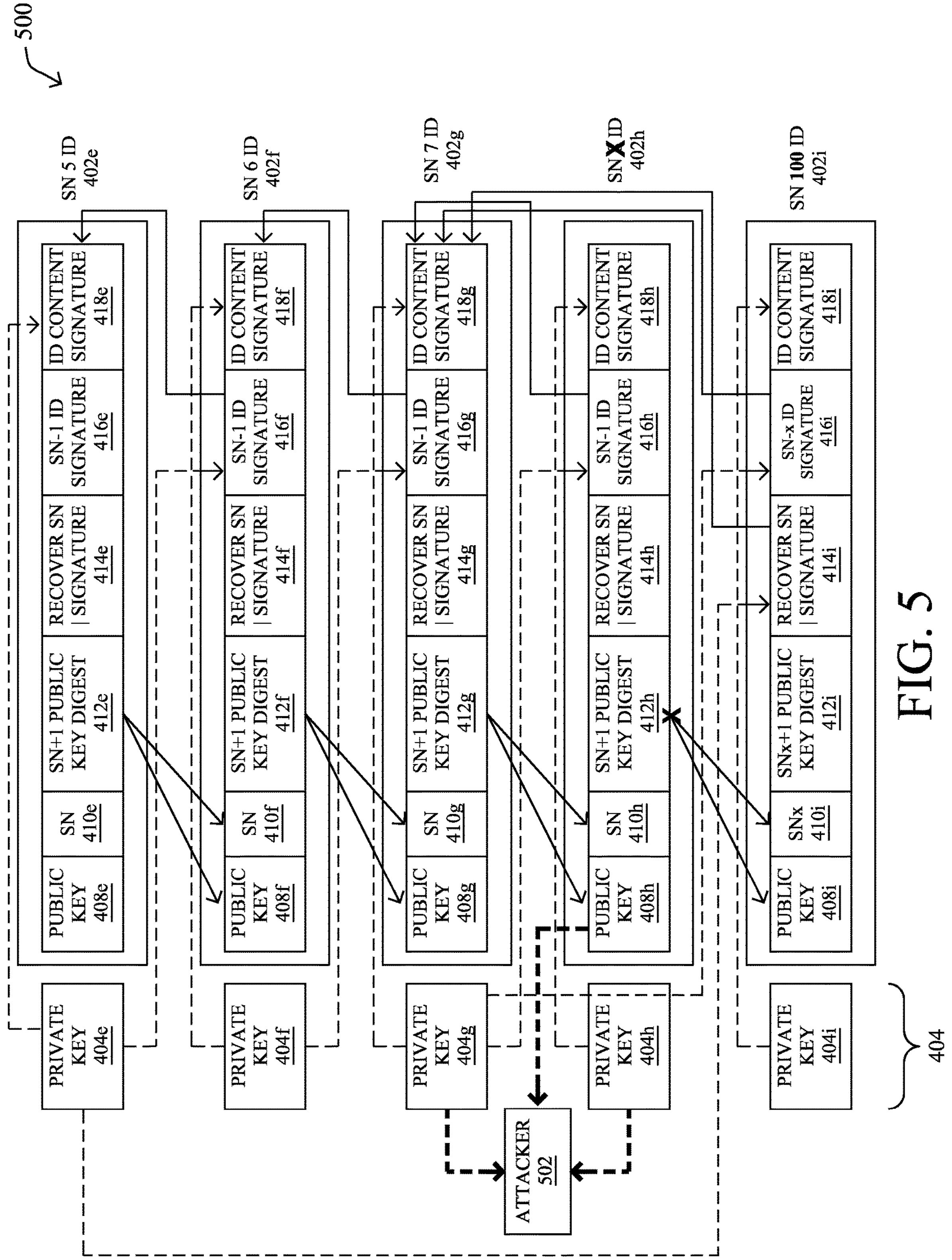
FIG. 5 illustrates an example diagram of a digital identity being compromised.

By way of example, FIG. 5 illustrates a diagram 500 of a digital identifier being compromised, according to some embodiments. As shown, assume that there is a chain of digital identifiers 402*e*-402*g* that are generated via the rotation mechanism described previously. Thus, these digital identifiers 402*e*-402*g* are cryptographically linked to one another, allowing an entity to quickly verify not only the validity of a given identifier, but also its lineage.

Now, assume that an attacker 502 somehow manages to obtain the private key 404*g* that was used to sign digital identifier 402*g* with the signature from signature field 418*g*, the next public key from field 408*h* to be used, as well as the next private key 404*h* to be used. In such a case, attacker 502 could theoretically generate a new digital identifier 402*h* under their control. Essentially, this means that attacker 502 has supplanted the digital identity, thereby creating an attack vector for any transaction that relies on the validity of digital identifiers 402 (e.g., by releasing malware as a seemingly legitimate new versions of software, etc.).

According to various embodiments, recovery of the digital identity is still possible by leveraging the private key information from a previous digital identifier 402. For instance, as shown in FIG. 5, the private key from field 404*e* that was used to sign digital identifier 402*e* with the signature from field 418*e* could be used by cryptographic process 248 to generate a new digital identifier 402*i* that supersedes digital identifier 402*h* and regains control over the digital identity. To do so, cryptographic process 248 may generate digital identifier 402*i* as normal, but with the following additional steps/modifications:

- The prior signature included in field 416*i* of digital identifier 402*i* may be from the most recent, non-compromised digital identifier 402. For instance, in this case, signature 416*i* may match the signature from field 418*g* from digital identifier 402*g* and NOT from the most recent, yet compromised, digital identifier 402*h*.
- Recovery field 414*i* includes a signature generated using a private key 404 associated with a prior digital identifier 402 that predates that of the compromised one. For instance, recovery field 414*i* may include a signature generated using private key 404*e*, which had been previously used to sign digital identifier 402*e* with signature 418*e*. Note that the recovery field 414 up to this point may be empty in the prior digital identifiers 402*e*-402*h*, if no recovery had taken place up until this point.

In terms of the serial numbers, a simple approach would be to simply use the next serial numbers in line during the generation of digital identifier 402*i* for field 410*i*, for example. However, a more secure embodiment provides for cryptographic process 248 to also randomly select a new serial number for digital identifier 402*i* that jumps forward. For instance, say digital identifier 402*h* has a serial number of '8' in its field 410*h*. In such a case, cryptographic process 248 may randomly assign a serial number of '100' to digital identifier 402*i*. Doing so creates an alternate future serial number from that of attacker 502, but also includes the historic serial number proving element.

As would be appreciated, verification of the authenticity of a digital identifier 402 may be to first evaluate the authenticity of the digital identifier 402 with the highest serial number, and then trace back through the signed links for the preceding digital identifier 402. In addition, this recovery approach also creates a cryptographically baked in marker to recover a compromised identity. Such an approach may be taken, for instance, by identity verification engine 310 shown in FIG. 3, which may be executed by the same device that generates digital identifiers 402 and/or by any other device associated with a transaction in which a digital identifier 402 is used.

Figure 6:
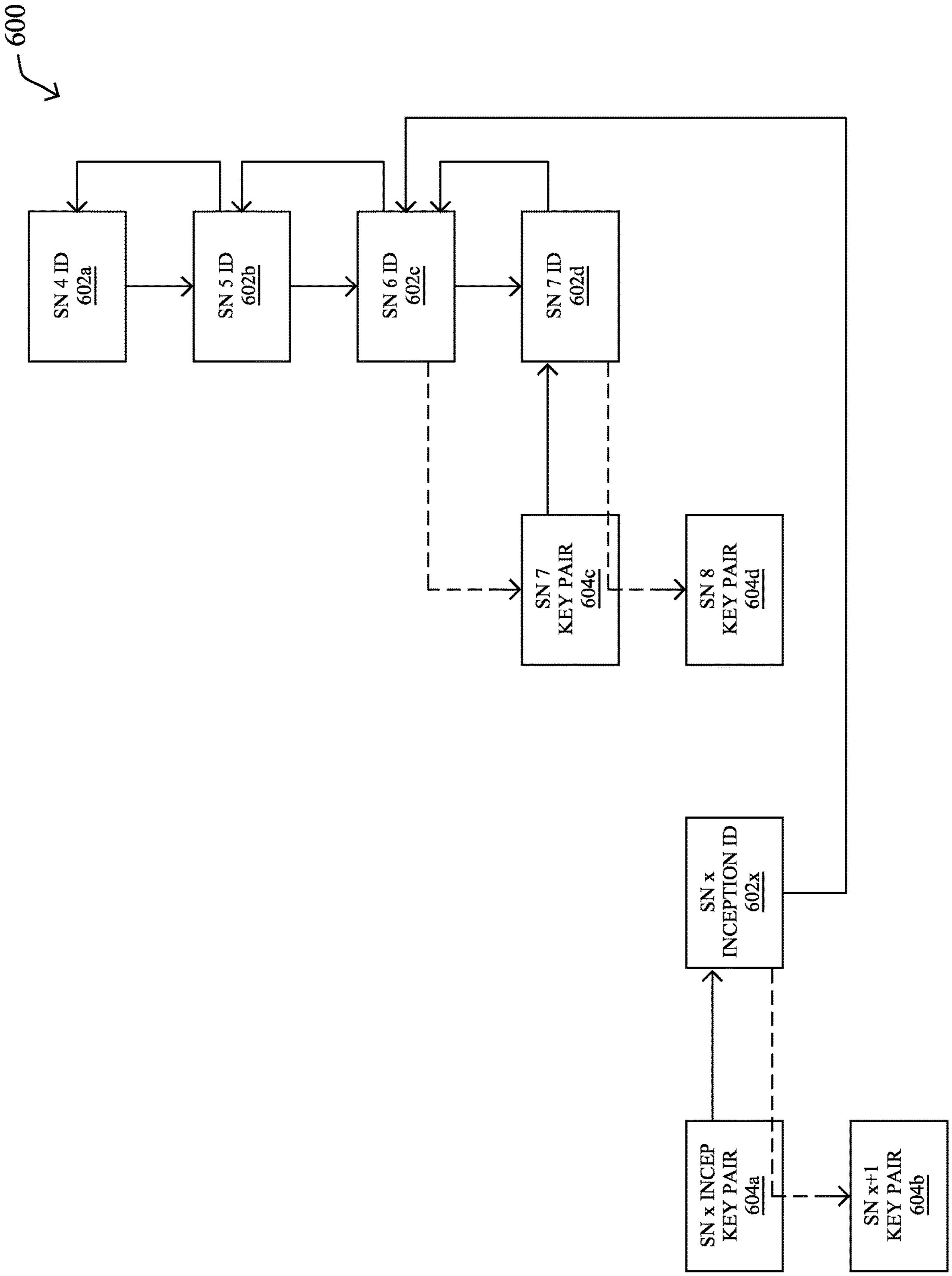
FIG. 6 illustrates an example diagram of the forking of a digital identifier.

Along the same lines as above, another potential function of the approach herein is the potential ability to fork a digital identifier, with any forked chain still having a provable, cryptographic lineage back to the fork point identifier, in some embodiments. For instance, as shown in FIG. 6, consider the chain of digital identifiers 602*a*-602*c*, with digital identifier 602*b* being generated/derived from digital identifier 602*a*, etc.

Now, assume that a fork in the chain of digital identifiers 402 is to be generated, with digital identifier 402*c* being the fork point in the chain. In such a case, a fork can be created by linking the inception digital identifier 602*x* (i.e., the initial digital identifier 602 in the chain that precedes even digital identifier 602*a*) to digital identifier 402*c*. Consequently, a new digital identifier 602*d* that is derived from the fork point digital identifier 602*c* will still have a provable lineage back to digital identifier 602*d* through the corresponding key pairs 604*a*-604*b* associated with inception digital identifier 602*x*, as well as key pairs 604*c*-604*d* associated with digital identifier 602*d*. Doing so creates many opportunities to generate sub-identifiers that are cryptographically traceable back to the primary key line.

There are various potential uses for the digital identifier generation process described above. For instance, the ability to trace software development and released modules or packages is tightly coupled to revision control systems and language specific module or package managers. Today, the authenticity of a software module or package is typically verified via a digest or hash. While this is a very strong cryptographic verification that the retrieved module or package is identical to the one presented at the storage location, it says nothing about the owner, how it was verified, how it was created, or even when it was created. Revision control systems (e.g. github.com) rely on a user ID (which could be an enterprise name) for authorship and traceability, which for individual contributors has a weak verification at creation to an email address. This ultimately forms a very poor foundation to build a software authenticity framework.

According to further embodiments, the digital identifier techniques herein could be leveraged to separate the notions of identity and credentials, thereby enabling the lifecycle of the credential to differ from the lifecycle of the identity. Here, an identity can be attributed to an actor (e.g., person or automated process), source code (e.g., file or even a function within a file), library/module/package (e.g., as a built component), an application (e.g., a binary executable), or other entity that may be involved in a transaction (e.g., download, installation, etc.). In such a case, the credential may take the form of a separate record that is cryptographically bound to the entity and describes the entity with cryptographically bound supporting metadata.

Figure 7:
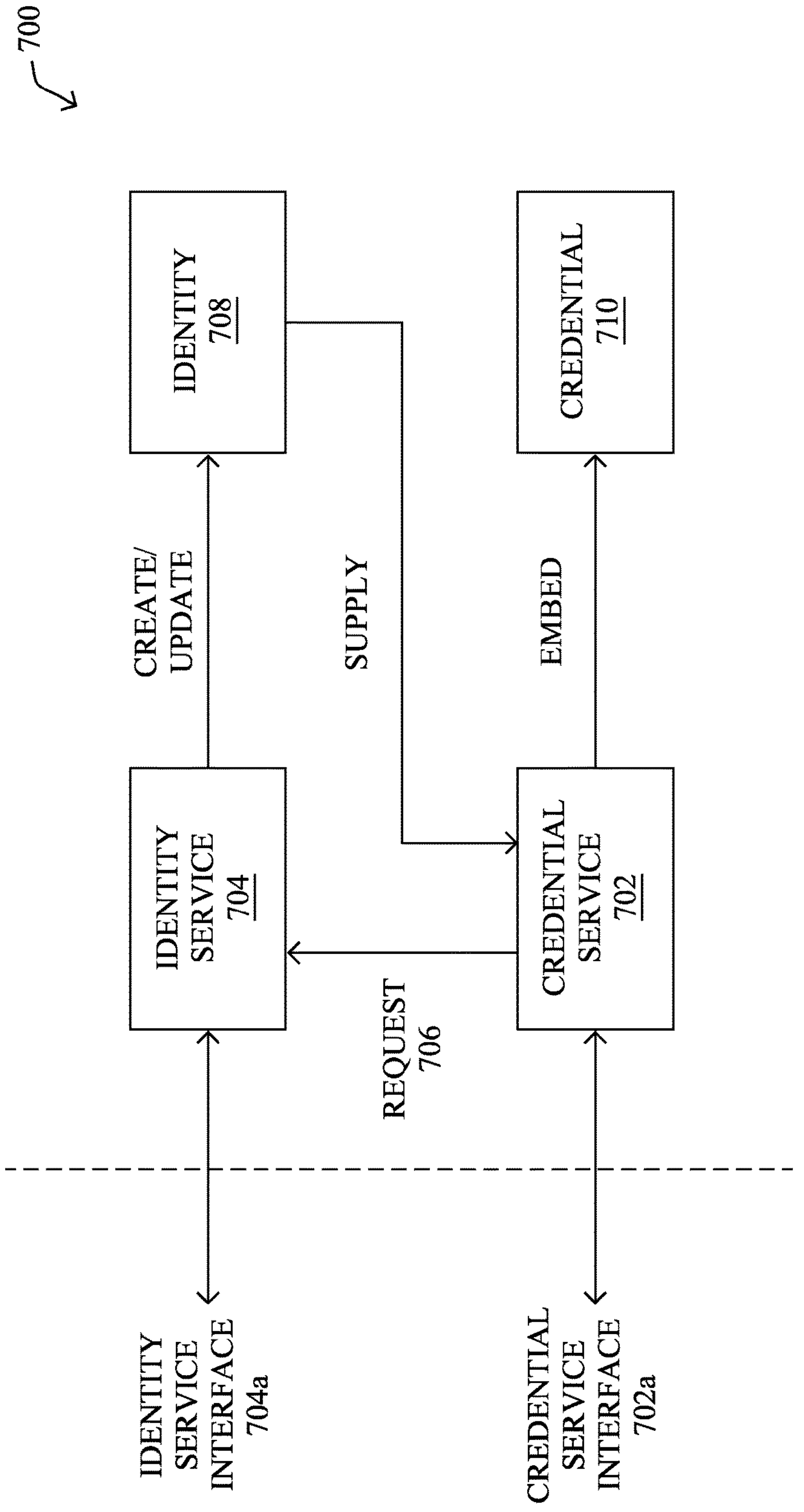
FIG. 7 illustrates an example system for applying an identity to an entity.

FIG. 7 illustrates an example system 700 for applying an identity to an entity, according to various embodiments. As shown, system 700 may separate identities and credentials through the use of separate services: a credential service 702 accessible via a credential service interface 702*a* and an identity service 704 accessible via an identity service interface 704*a*. Of course, in some embodiments, the functionalities of these two services may be combined as a singular service.

By leveraging the rotatable, recoverable identity model described previously, system 700 can create credential lifecycle procedures that enables the credential to evolve with the component to which it is bound, with historical traceability through the micro-ledger identities. Note that while system 700 is described primarily with respect to the software supply chain for illustrative purposes, it can equally be used for any other use case that could benefit from bound credentials and lineage records, as well.

By way of example, a credential 710 may take the form shown below:

- Credential
  - General
    - Credential ID
    - Issue Date
    - Valid From Date
    - Valid Until Date
  - Assertions
    - Component ID
    - Component Info.
      - Signature
      - Metadata [ ]
      - Metadata Signature
    - Valid From Date
    - Valid Until Date
- Proof
  - Proof ID
  - Created Date
- Signature Thus, a credential created by system 700, such as credential 710 shown, may generally include three sections: a general section that includes the credential ID and validity information, a component section that identifies the component to which the credential is bound (e.g., a piece of software, etc.), and a proof section that used to provide a cryptographic link back to prior credentials after update. More specifically, the contents of the credential may be as follows:

The content of the credential is in 3 sections:

General Section:

- Credential ID—used to identify the lifecycle of the whole credential
- Issue Date—populated only at credential inception
- Valid From/Valid Until Date—used as a validity timeline ensuring Credential ID rotation occurs in a defined period Assertion Section:

- Component ID—used to identify the lifecycle of the asserted component
- Component Info, Signature—the signature of the asserted component using the Component ID key. This creates the root element binding of the credential to the component.
- Component Info, Metadata [ ]—extension fields to hold credential owner defined metadata to describe the component
- Component Info, Metadata Signature—Signature of the Metadata using the Component ID key.
- Valid From/Valid Until Date—used as a validity timeline ensuring Assertion and Component ID rotation occurs in a defined period Proof Section:

- Proof ID—used to trace and prove changes to the credential over updates. See best practices for lifecycle of the Proof ID
- Created Date—set whenever any of the credential is changed and re-proofed Signature—In addition to the above, the overall credential may be signed, such as buy using a concatenation of the above and a signature generated using the proof ID key Of course, the specific structure of a credential may differ to include more or fewer fields, as desired, in other embodiments. In addition, each of the sections that make up the credential can have completely different lifecycles and be applied to different aspects of the credential.

In various embodiments, the Credential ID, Component ID, and/or Proof ID may be generated by identity service 704 as digital identifiers by cryptographic process 248 in accordance with the techniques described previously. In addition, as forking of a digital identifier is possible, the inception Credential ID could be a forked ID, thereby identifying the creator, who could be an actor (e.g., a person or automated process) or a formally recognized organization (e.g., an enterprise, government, school, utility, etc.).

Assume now that a request for a new credential is received by credential service 702 via credential service interface 702*a*. In turn, credential service 702 may send a request 706 to identity service 704 for new digital identifier information. In turn, identity service 704 may generate the corresponding identity 708, such as by executing cryptographic process 248, which is then returned to credential service 702 and embedded with the component information and metadata into credential 710.

The lifecycle for credential 710 may then be the following:

- Credential Creation—generate a clean credential ready to be bound to a root element
- Root Assertion—binding of a root element to a component with the component signature
- Extension Assertion—binding or an update binding for a supporting data element to the component bound to the root element
- Refresh Assertion—refresh the component assertion valid date range and Component ID—must be done if an updated root assertion is required
- Refresh Credential—refresh of the credential valid date range and Credential ID Through each of these steps, and at any time the credential is updated, the Proof ID may be rotated by identity service 704 by generating a new identity and key, thereby creating an attestable evolution at the identity layer across the credential. The assertion refresh rotates the Component ID and must be done if the root binding needs to be updated. This is needed if the component is updated (e.g. to a new release version), which also means the extension metadata needs to be updated. The credential refresh is needed to update the valid date range of the credential, which also triggers a Credential ID rotation. The credential ID does not generate any signatures, as described here, but could be used as the key to generate a public/private key hash of the credential for more efficient transfer.

Figure 8:
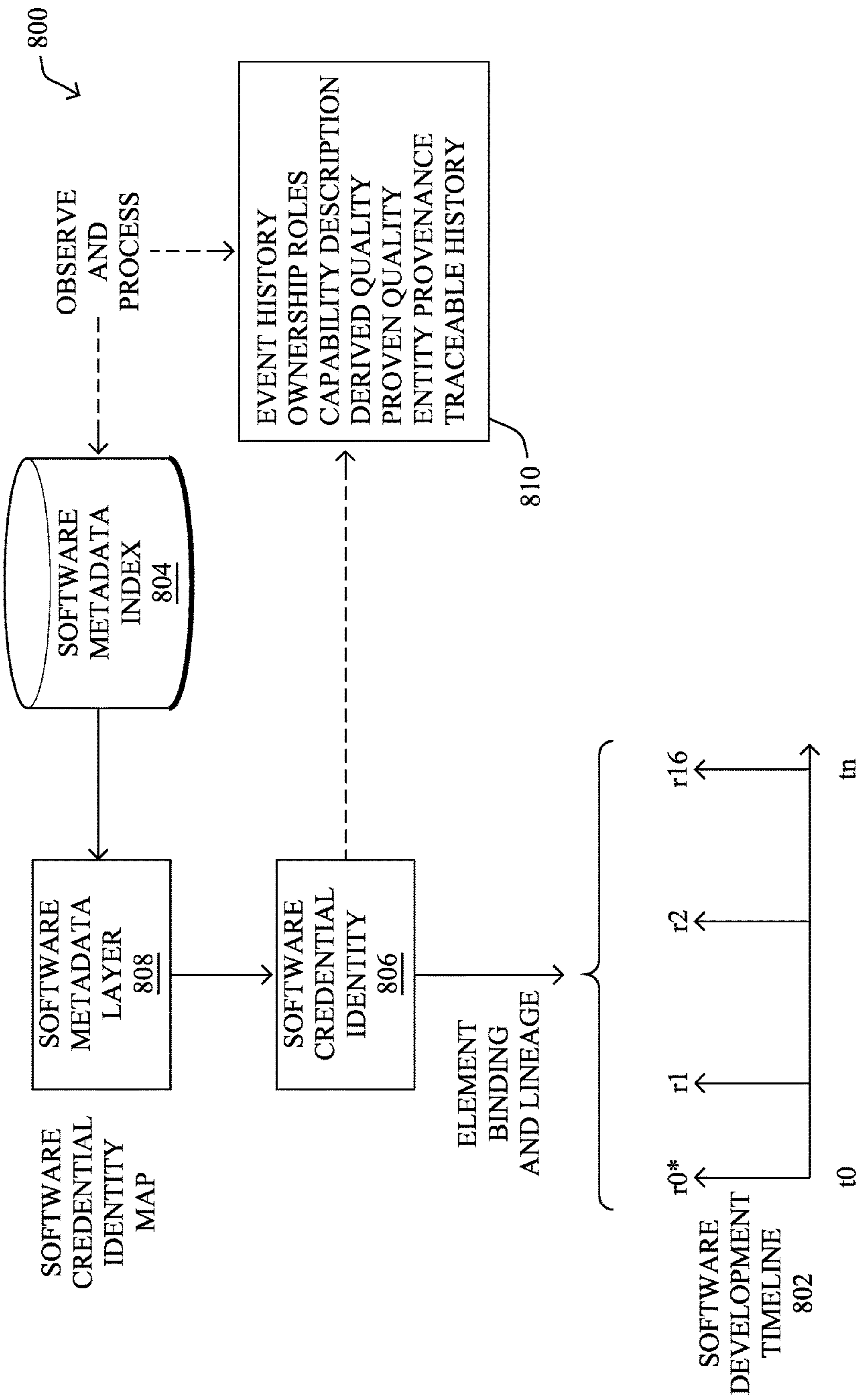
FIG. 8 illustrates an example of associating credential identities with different versions of software.

The end result of system 700 is a historical map of the evolution of the software package, etc., as it changes over time. By way of example, FIG. 8 illustrates an example 800 of associating credential identities with different versions of software. As shown, over the course of the software development timeline 802, different versions of the software may be developed (e.g., R0, R1, R2, etc.) over time.

Associated with the different software versions may be various metadata, which can be stored in a metadata index 804. By tying the stored metadata to software credential identities 806, to create a credential 810 for a given version, this effectively forms a software credential metadata layer 808 that maps the components that make up a software application into a searchable model that can be used to attest the content of the application. Here, supporting metadata can be recorded throughout development timeline 802, even between releases, with each individual change stored and linked to the micro ledger identity system underneath.

This approach can be extended to any system in which the binding of an identity and a credential to a digital entity is possible. Once the inception binding is done, even re-binding to a modified digital entity becomes possible as the identity is traceable back to the inception. As described, the inception binding action can also be linked to a parent identity for traceability, which can further identify the inception binding actor. Trust and authenticity are derived from the assured traceability of the credential through the identity as opposed to a one-time identity that is used for the life of the entity.

For example, for hardware components, a root of trust may be built into products which serve as a unique identifier which can be used in product bill of materials and runtime verification software. This is either an embedded cryptographic key at manufacture (TPM or other silicon embedded component) or more recently a physical unclonable function (PUF) which is a silicon fingerprint based on a voltage measurement module guaranteed to be unique. Whichever method is used, an embedded key at manufacture requires a secure manufacturing process. This moves the problem to the factory and the PUF capability, while improved, still requires a secure manufacturing process. So, while hardware components appear to have a root of trust, compromise is still possible at manufacturing time. To address this, the credential identity root binding and metadata binding described above could also be extended to hardware along with the metadata extension evolution over time, to deliver similar capabilities as software components. This can also be applied at the product level, such as by extending the above to bills of materials (BOMs) for either hardware or software products.

In further embodiments, the techniques herein could also be used in the context of personal data of an individual. Of course, applying an identity and root binding to a person is a little more difficult as a root of trust is needed. Even if this is biometrics, as with hardware components, this requires a secure manufacturing process to derive the biometric data, meaning that third party attestation is needed. For a person, this could also be done through the use of a notary or simply not performed at the pint of inception. The proposed system does not mandate either option but relies on complete cryptographic traceability back to the point of inception to map out a person's identifiable actions. This then creates a log of activity which can be verified and increased confidence over time. A person's inception identity and credential would not, therefore, be used as an immediate identity, but a point in time where traceable actions are be logged and used as proof. To further clarify the usage in an example, consider an inception government credential that could be used as a source to create subsequent credentials as a forked identity and credential (e.g., a driver's license, etc.).

Figure 9:
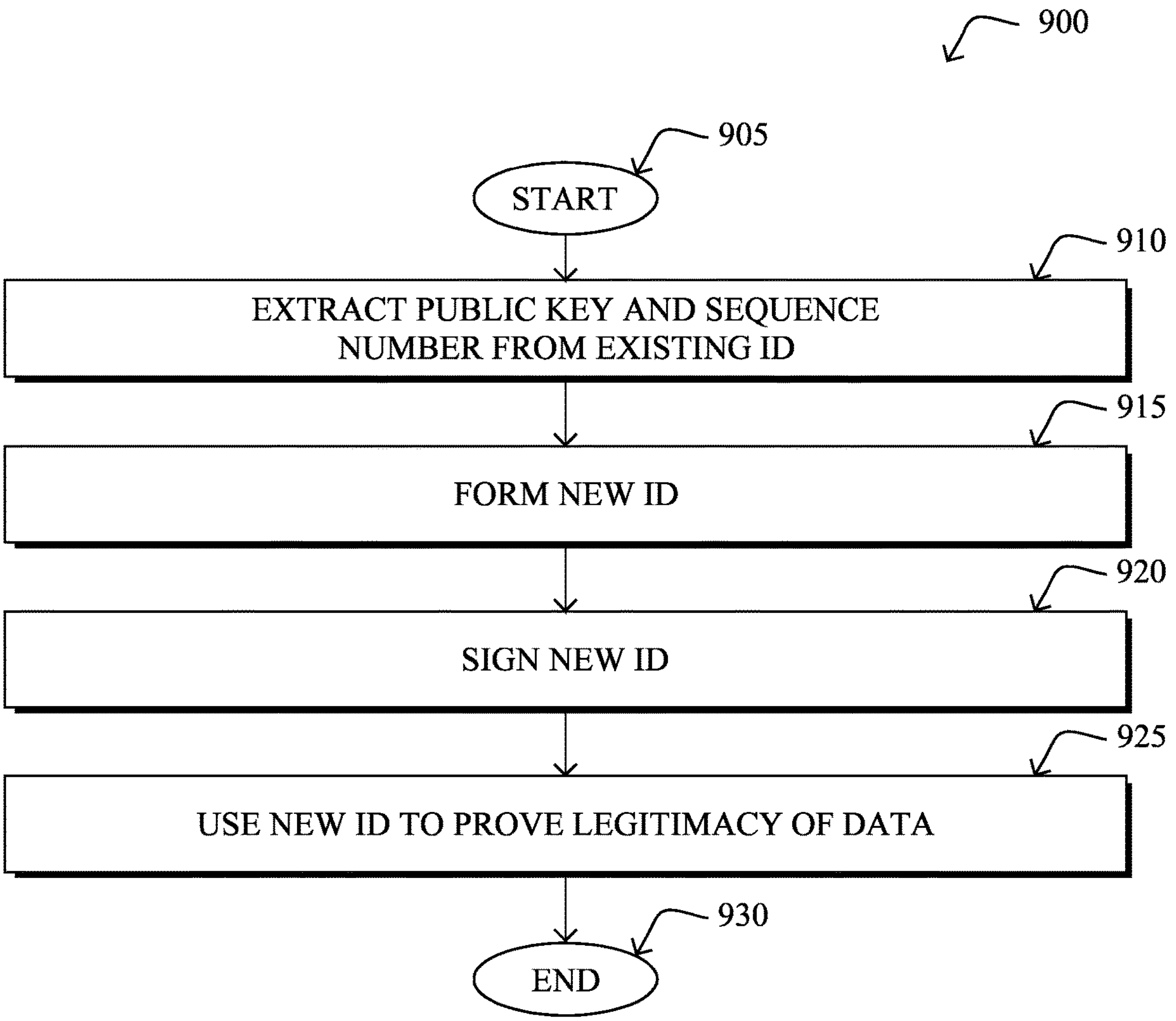
FIG. 9 illustrates an example simplified procedure for generating a digital identifier.

FIG. 9 illustrates an example simplified procedure 900 (i.e., a method) for generating a digital identifier, in accordance with one or more embodiments described herein. For example, a non-generic, specifically configured device (e.g., device 200), such as controller for a network (e.g., an SDN controller or other device in communication therewith,), a networking device, etc., may perform procedure 900 by executing stored instructions (e.g., cryptographic process 248). The procedure 900 may start at step 905, and continues to step 910, where, as described in greater detail above, the device may identify, for an existing digital identifier, a public key, a sequence number, and a signature.

At step 915, as detailed above, the device may form a new digital identifier that includes the public key, the sequence number, and the signature identified by the device for the existing digital identifier. In some embodiments, the new digital identifier further includes an indication of a cryptographic algorithm used by the device to sign the new digital identifier. In some embodiments, the public key is an asymmetric public key. In one embodiment, new digital identifier further includes a digest comprising a new public key for use to derive an additional digital identifier from the new digital identifier and an incremented value of the sequence number. In some embodiments, the device may also generate a forked digital identifier from the new digital identifier. In a further embodiment, the device provides an identity service and generates the new digital identifier in response to a request sent to the identity service.

At step 920, the device may sign the new digital identifier with a new signature using a private key, as described in greater detail above. As would be appreciated, by including information from the existing digital identifier in the new digital identifier and signing it with a private key of the device, this effectively creates a verifiable chain of evolution back to the existing digital identifier, as well as to any other digital identifiers from which the existing digital identifier was derived.

At step 925, as detailed above, the device may use the new digital identifier to prove legitimacy of data associated with the new digital identifier. In some embodiments, the data associated with the new digital identifier comprises software or metadata for software. In various embodiments, the existing digital identifier and the new digital identifier are part of a chain of related digital identifiers. In such a case, the device may further determine that a particular digital identifier in the chain of related digital identifiers was maliciously generated and generate a recovery digital identifier that has a sequence number that is sequentially greater than that of the particular digital identifier. In one embodiment, the device may do so by including a recovery signature in the recovery digital identifier generated using a private key that was previously used to create the signature of the existing digital identifier. In a further embodiment, the device may include in the recovery digital identifier a signature of a prior digital identifier in the chain of related digital identifiers. In another embodiment, the sequence number of the recovery digital identifier is selected randomly. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for cryptographic proof of identity with independent verification and provable recovery, it is to be understood that various other adaptations and modifications may be made within the spirit and scope of the embodiments herein. For example, while the techniques herein are described in the context of providing proof of identity to software versions, BOMs, etc., these use cases are intended to be illustrative only and the techniques herein could be used for any number of other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

identifying, by a device and for an existing digital identifier for an entity, an existing public key, a next public key digest field storing a cryptographic digest of a next public key, a sequence number, and a signature that signed the existing digital identifier, the signature having been generated using a first private key;

forming, by the device, a new digital identifier for the entity that includes the next public key, an incremented value of the sequence number, and a field storing the signature that signed the existing digital identifier, wherein a cryptographic digest of the next public key equals the cryptographic digest stored in the next public key digest field;

signing, by the device, the new digital identifier with a new signature using a cryptographic algorithm and a second private key; and using, by the device, the new digital identifier to prove legitimacy of data associated with the new digital identifier.

2. The method as in claim 1, wherein the new digital identifier further includes an indication of the cryptographic algorithm used by the device to sign the new digital identifier.

3. The method as in claim 1, wherein the next public key is an asymmetric public key.

4. The method as in claim 1, wherein the new digital identifier further includes a next public key digest field storing a digest of a further public key for deriving an additional digital identifier and a further incremented value of the sequence number.

5. The method as in claim 1, wherein the existing digital identifier and the new digital identifier are part of a chain of related digital identifiers, the method further comprising:

determining that a particular digital identifier in the chain of related digital identifiers was maliciously generated; and generating a recovery digital identifier that has a sequence number that is sequentially greater than that of the particular digital identifier.

6. The method as in claim 5, wherein generating the recovery digital identifier comprises:

including a recovery signature in the recovery digital identifier generated using a private key that was previously used to create the signature of the existing digital identifier.

7. The method as in claim 5, wherein generating the recovery digital identifier comprises:

including, in the recovery digital identifier, a signature of a prior digital identifier in the chain of related digital identifiers.

8. The method as in claim 5, wherein the sequence number of the recovery digital identifier is selected randomly.

9. The method as in claim 1, further comprising:

generating a forked digital identifier from the new digital identifier.

10. The method as in claim 1, wherein the data associated with the new digital identifier comprises software or metadata for software.

11. An apparatus, comprising:

one or more network interfaces;

a processor coupled to the one or more network interfaces and configured to execute one or more processes; and a memory configured to store a process that is executable by the processor, the process when executed configured to:

identify, for an existing digital identifier for an entity, an existing public key, a next public key digest field storing a cryptographic digest of a next public key, a sequence number, and a signature that signed the existing digital identifier, the signature having been generated using a first private key;

form a new digital identifier for the entity that includes the next public key, an incremented value of the sequence number, and a field storing the signature that signed the existing digital identifier, wherein a cryptographic digest of the next public key equals the cryptographic digest stored in the next public key digest field;

sign the new digital identifier with a new signature using a cryptographic algorithm and a second private key; and use the new digital identifier to prove legitimacy of data associated with the new digital identifier.

12. The apparatus as in claim 11, wherein the new digital identifier further includes an indication of the cryptographic algorithm used by the apparatus to sign the new digital identifier.

13. The apparatus as in claim 11, wherein the next public key is an asymmetric public key.

14. The apparatus as in claim 11, wherein the new digital identifier further includes a next public key digest field storing a digest of a further public key for deriving an additional digital identifier and incremented value of the sequence number.

15. The apparatus as in claim 11, wherein the existing digital identifier and the new digital identifier are part of a chain of related digital identifiers, the process when executed further configured to:

determine that a particular digital identifier in the chain of related digital identifiers was maliciously generated; and generate a recovery digital identifier that has a sequence number that is sequentially greater than that of the particular digital identifier.

16. The apparatus as in claim 15, wherein the apparatus generates the recovery digital identifier by:

include a recovery signature in the recovery digital identifier generated using a private key that was previously used to create the signature of the existing digital identifier.

17. The apparatus as in claim 15, wherein the sequence number of the recovery digital identifier is selected randomly.

18. The apparatus as in claim 15, wherein the process when executed is further configured to:

generate a forked digital identifier from the new digital identifier.

19. The apparatus as in claim 11, wherein the apparatus provides an identity service and generates the new digital identifier in response to a request sent to the identity service.

20. A tangible, non-transitory, computer-readable medium storing program instructions that cause a device to execute a process comprising:

identifying, by a device and for an existing digital identifier for an entity, an existing public key, a next public key digest field storing a cryptographic digest of a next public key, a sequence number, and a signature that signed the existing digital identifier, the signature having been generated using a first private key;

forming, by the device, a new digital identifier for the entity that includes the next public key, an incremented value of the sequence number, and a field storing the signature that signed the existing digital identifier, wherein a cryptographic digest of the next public key equals the cryptographic digest stored in the next public key digest field;

signing, by the device, the new digital identifier with a new signature using a cryptographic algorithm and a second private key; and using, by the device, the new digital identifier to prove legitimacy of data associated with the new digital identifier.

* * * * *